United States Patent Office 3,456,362
Patented July 22, 1969

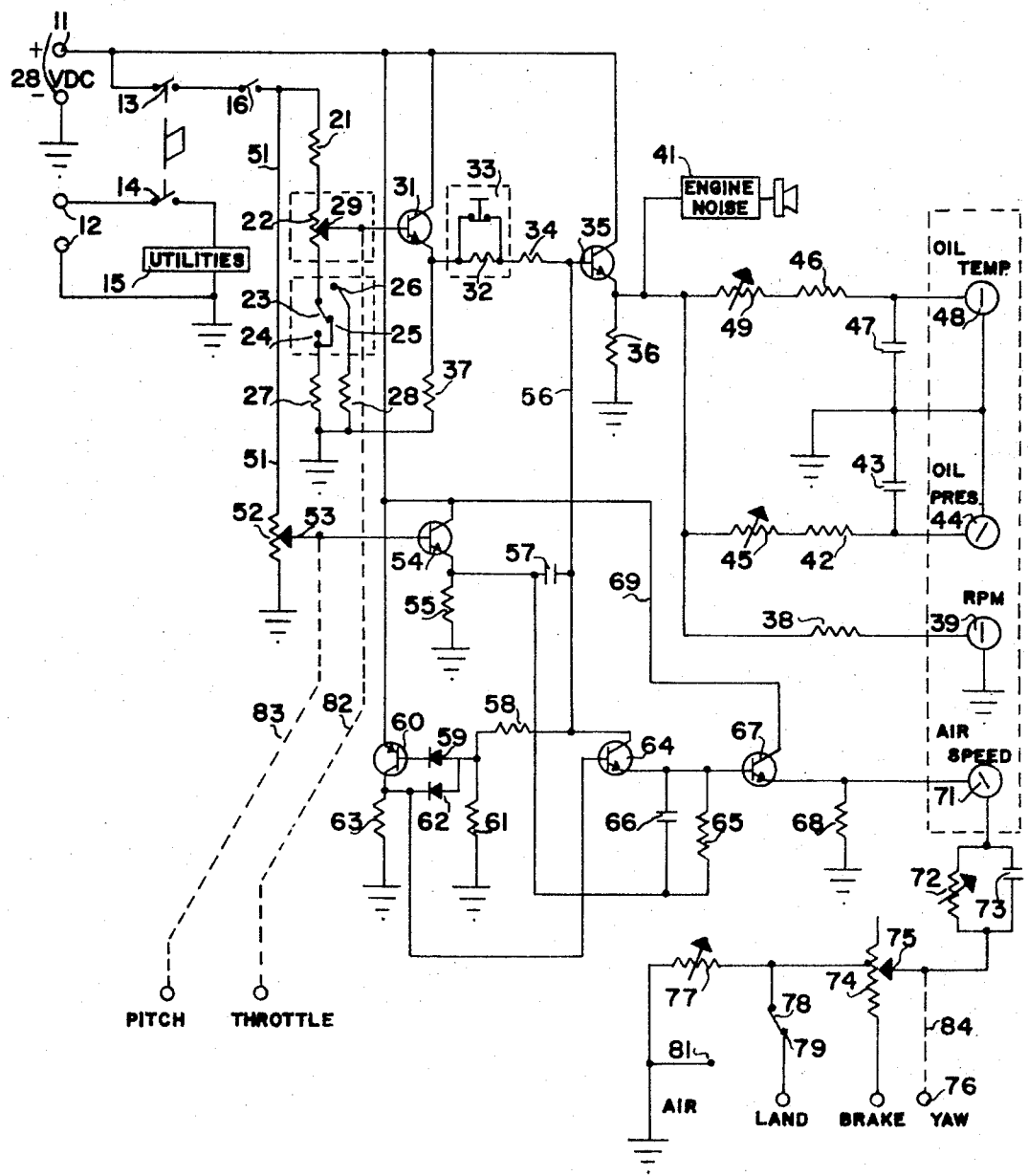

3,456,362
SIMULATOR INSTRUMENTATION
William C. Ebeling, Binghamton, N.Y., assignor to Singer-General Precision, Inc., Binghamton, N.Y., a corporation of Delaware
Filed Dec. 9, 1966, Ser. No. 600,633
Int. Cl. G09b 9/08
U.S. Cl. 35—12    3 Claims

ABSTRACT OF THE DISCLOSURE

In small general purpose trainers which simulate the operation of vehicles, the older forms of apparatus which were used to drive the vehicle instruments have become bulky and outmoded. This invention comprises a small, compact and lightweight electronic system for driving a plurality of electrical instruments which may be found in simple vehicle simulators. As shown, the circuit is formed of solid state elements.

This invention relates to apparatus for simulating the flight conditions of an aircraft and, more particularly, to electrical circuitry which drives instruments to provide flight information to a trainee in an aviation trainer.

One of the earliest types of simulators for training vehicle operators is the so-called "Link trainer" which simulated aircraft controls and flight characteristics. Modern versions of the Link trainer have become much more complex as the aircraft which they simulate have become much more complex. However, there is still the need for a small, general purpose, basic flight simulator which provides basic training to a student pilot first learning to fly. A trainer of this type should, necessarily, be small, and be simple. Since its primary function is basic training, the controls should be kept simple and the instruments should remain simple. However, even in the simplest of aircraft trainers, certain basic instruments are required. Among these are:

A. Rate-of-climb
B. Altimeter
C. Tachometer
D. Air speed indicator
E. Oil pressure indicator
F. Oil temperature indicator In addition, the basic cockpit could contain an artificial horizon, a compass, alternator meters, and similar conditional indicators. Some of these instruments have dubious value in a trainer which is primarily designed to train a student in the basic principles of flight. However, whatever instruments are included in the simulator, means must be provided to drive these instruments so that they properly indicate the conditions they are to display and respond to the operation of both the student pilot and, when there is one, to the actions of an instructor. Past systems for driving cockpit instruments in simulators have taken many forms including mechanical devices, pneumatic devices, hydraulic devices and electrical devices. Many of the prior art systems have been complex, cumbersome, large and heavy. A reduction in any of these characteristics is desirable.

It is an object of this invention to provide a new and improved system for driving the instruments of a basic flight trainer.

It is another object of this invention to provide a new and improved electrical system for driving the instruments of a primary aviation trainer.

It is a further object of this invention to provide a new and improved electronic system for driving the instruments of a flight trainer.

It is still another object of this invention to provide a new and improved electronic system which is small, and simple for driving electrical instruments in a primary vehicle trainer.

It is yet a further object of this invention to provide a new and improved highly reliable electronic system for driving vehicle instruments.

Other objects and advantages of this invention will become apparent as the following description proceeds, which description should be considered together with the accompanying drawings in which the single figure is a schematic circuit diagram of the system of this invention.

Referring to the drawing in detail, the reference character 11 designates a pair of terminals to which a direct current power supply is connected, and the reference character 12 designates a pair of terminals to which a source of alternating current may be connected. A master switch 13 connects the direct current terminals 11 to the rest of the circuit, and a master switch 14, ganged with the switch 13 so that they operate together, connects the alternating current terminals 12 with the alternating current driven equipment including the main power motors, if any, all designated in the figure by the block 15. An ignition switch 16 is connected to the main D.C. switch 13 and supplies, when closed, direct current through a resistor 21 to a throttle potentiometer 22. The other end of the potentiometer 22 is connected to a single pole, triple throw switch 23 which has stationary terminals 24, 25 and 26. The switch 23 is the magneto switch, and terminals 24 and 25 are connected together and through a resistor 27 to ground. The terminal 26 is connected through a resistor 28 to ground. The potentiometer 22 includes a sliding contact 29 which is directly connected to the base electrode of a throttle transistor 31 whose collector electrode is directly connected to the positive terminal 11 and whose emitter electrode is connected through a load resistor 37 to ground. An output from the throttle transistor 31 is taken across the load resistor 37 through a carburetor heat resistor 32, which is shunted by a carburetor heat switch 32, and an engine thrust resistor 34 and is applied to the base electrode of an engine transistor 35. The engine transistor 35 has is collector electrode directly connected to the positive terminal 11 and its emitter electrode connector through a load resistor 36 to ground. The output from the engine transistor 35 is taken across the load resistor 36 and is applied to the input of an engine noise generator 41 and to three instrument branches in parallel. One instrument branch comprises a engine speed resistor 38 which is connected to one side of a tachometer 39, the other side of which is grounded. Another branch is connected through a series arrangement of an oil pressure resistor 42 and an oil pressure adjustment potentiometer 45 to one side of an oil pressure instrument 44. The third branch includes the series arrangement of an oil temperature resistor 46 and an oil temperature adjustment potentiometer 49 which is connected to one side of an oil temperature instrument 48, the other side of which is grounded. An oil temperature capacitor 47 is connected across the instrument 48.

Also connected to the ignition switch 16 is a rate-of-climb line 51 which is connected to one side of a rate-of-climb potentiometer 52, the other side of which is connected to ground. The rate-of-climb potentiometer 52 has a slide 53 directly connected to the base electrode of a rate-to-climb transistor 54 which has its collector electrode connected to the positive terminal 11 and its emitter electrode connected through a load resistor 55 to ground. The output of the rate-of-climb transistor 54 is taken across the load resistor 55 and is applied through a resistor 65 to the base electrode of an air speed transistor 67, the collector electrode of which is connected to the positive terminal 11 and the emitter electrode of which is connected through a load resistor 68 to ground. A capacitor 66 is connected across the resistor 65. In addition, the output from the rate-of-climb transistor 54 is coupled through a capacitor 57 to an engine line 56 which supplies a voltage through a resistor 58 and a first diode 59 to the base electrode of a climb transistor 60. The climb transistor 60 has its emitter electrode connected to the positive terminal 11 and its collector electrode connected through a load resistor 63 to ground. In addition, a second diode 62 connects the junction of the collector electrode of the transistor 60 and the resistor 63 with one end of a resistor 61, the other end of which is grounded. The output from the climb transistor 60 is taken across the load resistor 63 and applied to the base electrode of a transistor 64, the collector electrode of which is connected to the base electrode of the engine transistor 35. The emitter electrode of the transistor 64 is connected to the base electrode of an air speed transistor 67, the collector electrode of which is connected through a line 69 to the positive terminal 11 and the emitter electrode of which is connected to ground through a load resistor 68. The base electrode of the transistor 67 and the emitter electrode of the transistor 64 are connected to ground capacitor 66 and through a parallel combination of a resistor 65 and a series resistor 55, which is in the load circuit of the rate-of-climb transistor 54. A capacitor 57 couples the emitter electrode of the rate-of-climb transistor 54 to the collector electrode of the transistor 64. The output from the air speed transistor 67 is connected across the load resistor 68 to one side of an air speed indicator 71, the other side of which is connected through a voltage divider to ground. The air speed voltage divider includes a potentiometer 72 which is in parallel with a capacitor 73, a potentiometer 74 having a slide contact 75, and an adjustable resistor 77. A switch 78 is connected across the adjustable resistor 77 by means of one fixed contact 81, and by means of another fixed contact 79 the switch 78 connects one end of the resistor 77 to a landing input terminal.

Mechanical inputs are supplied to the circuitry of the figure by means of connections to the various potentiometers. Thus, the slide 29 of the throttle potentiometer 22 is mechanically connected by means of a linkage 82, shown in dashed lines to the throttle in the cockpit (not shown). The slide 53 of the rate-of-climb potentiometer 52 is connected by means of mechanical linkages 83, shown as dashed lines in the figure, to a portion of the cockpit or controls which indicates the pitch of the cockpit. A mechanical linkage 84, shown as dashed lines, connects the rudder mechanism (not shown) to the slide 75 of the potentiometer 74. In addition, a signal can be supplied to one end of the potentiometer 74 when toe brakes are applied.

When the main switches 13 and 14 are closed, both direct current and alternating current power are supplied to the trainer. The alternating current power may be from a standard 115 volt–208 volt A.C. commercial network and is used to energize the motors which drive the trainer, appropriate lighting, ventilating or air conditioning motors, and the like. The direct current power may be from a source of 28 volts or the like and primarily serves to supply energization to the circuit shown in the figure. When the ignition switch 16 is closed, current flows from the positive terminal 11 through the voltage divider formed by the resistor 21, the potentiometer 22, and either of resistor 27 or 28, depending upon the switch 23. When the magneto switch 23 makes contact with contact 24 or with contact 25, resistor 27 is placed in series in the voltage divider circuit. The switch positions represented by the contacts 24 and 25 are respectively the magneto position for engine 1 and that for engine 2, The position of the switch represented by the contact 26 represents the magnetos of both engines 1 and 2, and the resistor 28 is correspondingly different from that of resistor 27 to provide a higher potential at the slide 29 when the magneto switch 28 is in the 2-engine position than when it is in the 1-engine position. The voltage appearing at the slide 29 is, to some extent, dependent upon the position of the throttle which, in turn, controls the position of the slide 29 on the potentiometer 22. The direct potential at the slide 29 is applied to the base electrode of the throttle transistor 31 and controls the conduction therethrough. The current flowing through the transistor 31 also passes through the load resistor 37 in the emitter circuit, and the voltage drop across the load resistor 37 is applied through a carburetor heat resistor 32 and through an engine thrust resistor 34 to the base electrode of the engine transistor 35. Normally, the carburetor heat resistor 32 is shorted out of the circuit by the carburetor heat switch 33 which is kept closed. But an instructor may change the situation by opening the switch 33 to modify the potential applied to the base electrode of the transistor 35. The current flowing through the transistor 35 is controlled by the voltage applied to its base electrode, and its current also flows through the load resistor 36. Thus, the potential drop across the load resistor 36 is dependent upon the complete chain of events which precedes the transistor 35. This potential is applied to an engine noise generator 41 to control the frequency of the engine noise signal which is generated. The engine noise circuit is not the subject of this patent application and will not be further described herein. The voltage which appears across the load resistor 36 is one which represents engine speed, and it is applied through only a limiting resistor 38 to a tachometer 39. Thus, the tachometer 39 indicates directly the simulated speed of the simulated aircraft during its simulated mission. That same voltage appearing across the resistor 36 is also applied to an oil temperature indicator 48 through an adjustable resistor 49, which is used initially to set the range of the instrument 48, and thorugh an integrating circuit comprising a series resistor 46 and a shunt capacitor 47. The integrating circuit comprising the resistor 46 and the capacitor 47 serves to dampen variations in the potential applied to the instrument 48. In this manner, momentary fluctuations in the apparent speed will not produce substantial variations in the oil temperature as it is shown on the instrument 48. Similarly, the potential derived across the resistor 36 is applied through a calibrating adjustable resistor 45 and an integrating circuit comprising a series resistor 42 and a shunt capacitor 43 to one side of an oil pressure gauge 44. Again, the integrating circuit formed of resistor 42 and capacitor 43 serves to integrate momentary fluctuations in the apparent speed of the engine so that the oil pressure as shown on the instrument 44 varies at a much slower rate than the engine speed and only for large changes in engine speed.

The direct current voltage applied through the ignition switch 16 is also applied across the potentiometer 52. The setting of the slide 53 on the potentiometer 52 is determined by the pitch of the cockpit, and the voltage from the slide 53 to ground is applied directly to the base electrode of the rate-of-climb transistor 54. The output from the transistor 54 taken across the load resistor 55 is one component of the rate-of-climb. The rate-of-climb is determined by the pitch of the aircraft and by the engine thrust. Air speed is determined by the rate-of-climb and the engine thrust, as well as by several other miscellaneous factors such as braking when on land, rate-of-turn, etc. Therefore, in order to indicate air speed, potentials must be derived which are proportional to engine speed and to the pitch of the cockpit. The potential derived across the load resistor 37 of the throttle transistor 31 is proportional to the speed of the engine and is applied to one side of the capacitor 57. The rate-of-climb potential taken across the load resistor 55 is applied to the other side of the capacitor 57. As the engine speed increases to a point where the plane begins to move, the potential across diode 59 increases until that diode conducts and a voltage is suddenly applied to the transistor 60 so that the transistor switches on, providing the transistor 64 with potential on its base electrode. When transistor 64 conducts, capacitor 66 is placed in parallel with capacitor 67 through the transistor 64. This produces a sudden drop in the indicated engine speed by momentarily drawing current through the resistor 34 and lowering the potential applied to the base electrode of the engine transistor 35. As the capacitor 66 charges, the indication on the tachometer 39 rises. The effective engine speed is applied as a potential through the transistor 64, and a potential proportional to the rate-of-climb or the pitch angle of the aircraft is effectively applied through the resistor 65, to the base electrode of the transistor 67 wherein the two signals are combined to produce an algebraic sum as an output. This output is derived across the load resistor 68 and is applied to the air speed indicator 71. However, the other side of the air speed indicator 71 is not connected directly to ground but through a variable resistor 72 which may be used to represent a flap control and through a potentiometer 74. The effective resistance of the potentiometer 74 in the circuit of the meter 71 is determined by the position of its slide 75. The slide 75 is mechanically connected through a linkage 84 to the rudder system so that the yaw of the aircraft affects the current flowing through the air speed indicator 71. In addition, when the airplane is on the ground and the brakes are applied, the switch 78 is moved into the land position, which is contact 79, to place an additional series resistor 77 in the circuit. This further decreases the amount of current flowing through the circuit of the meter 71 and decreases the indication of the air speed as shown by that meter.

To summarize the operation of the circuit shown in the figure of the drawings, a direct current is applied simultaneously to two potential dividers. In a first potential divider, the position of a magneto switch helps determine the amount of resistance in the circuit depending upon whether one or two engines are switched on. In addition, the resistance in the first potential divider circuit is also determined by the position of the slide on a potentiometer, which position is proportional to the position of the throttle lever. Thus, the output voltage derived from this first potential divider is proportional to the setting of the throttle and the operation of either one or two engines. This may be modified slightly by opening a switch adding to this circuit a resistance which represents a cold carburetor. When the carburetor has heated, the switch may be closed, the resistance in the circuit is decreased, and the output signal is increased to represent a higher motor speed. After amplification, the resultant potential is applied to an engine noise generator circuit to control the sound of the engine, to a tachometer to indicate the engine speed, and to oil temperature and pressure circuits which are individually controlled for individual adjustment and time constant. The D.C. voltage is applied to a second potential divider which comprises at least a potentiometer. The position of the slide in this potentiometer is proportional to the attitude of the aircraft. This potential is applied to one side of a capacitor while the engine potential is applied to the other. The differences in the potential appearing across this capacitor determines the energization of a transistor. In addition, when the engine speed, as represented by a voltage, increases to a predetermined point, a transistor switch is turned on throwing a second capacitor in parallel with the first. This causes a momentary decrease in the apparent motor speed, oil pressure and oil temperature such as that which occurs when the plane begins to move. When the potential drop across the two parallel capacitors reaches a sufficient value, the potential indicative of engine speed and that representative of the aircraft pitch are combined to produce an output signal which is representative of air speed. However, this potential is also capable of modification by the yaw of the aircraft, by the application of brakes when the aircraft is on the ground, and by a flap control. The resultant potential governs the indication of an air speed indicator.

The above specification has described and illustrated a new and improved circuit for evolving electrical control of electrical instrumentation in a small aircraft simulator or other vehicle. Shown and illustrated in the above description are four instruments with the circuitry for effecting overall control of all of the instruments. This circuit also includes seven external controls for modifying the indications on the instruments in a manner proportional to that which would be indicated in the aircraft itself. This entire instrumentation is achieved by the use of only six transistors, two diodes, and an assorted number of resistors and capacitors. It is realized that the above description may indicate to those skilled in the art additional ways in which the principles of this invention may be used without departing from its spirit. It is, therefore, intended that this invention be limited only by the scope of the appended claims.

What is claimed is:

1. An electrical system for driving instruments of a simulated vehicle for training purposes, said system including means for applying a datum electrical potential to said system, a first variable impedance having said datum signal applied to it and having its impedance varied in response to the throttle setting of said simulated vehicle, means for indicating the apparent engine speed for said simulated vehicle, means for applying a potential derived from said first variable impedance to said engine speed indicator, means for indicating engine oil pressure, a first fixed impedance, means for connecting a potential derived from said first variable impedance to a series arrangement of said first fixed impedance and said oil pressure indicator, means for indicating engine oil temperature, a second fixed impedance, means for applying a potential derived from said first variable impedance to a series arrangement of said second fixed impedance and said oil temperature indicators, a third fixed impedance, means for connecting said third fixed impedance in series with the output from said first variable impedance, means for selectively short-circuiting said third fixed impedance, to introduce and remove a fixed engine condition from the circuits of said engine condition indicators, means for indicating vehicle speed, a second variable impedance, means for applying said datum electrical signal to said second variable impedance, means for varying the impedance of said second variable impedance in proportion to vehicle attitude with respect to the horizon, an electrical mixer circuit, means for applying the output from said first variable impedance and a potential output from said second variable impedance to said mixer circuit, means for applying the output from said mixer circuit to said vehicle speed indicating instrument, said simulated vehicle having a motion characteristic such that the vehicle does not begin to move from a standstill until the engine has reached a prescribed speed, an electronic switch responsive to potential variations to open and close, means for applying a potential derived from said first variable impedance and proportional to engine speed to control said electronic switch, and means for connecting said electronic switch in series between said second variable impedance and said instrument for indicating vehicle speed, whereby said vehicle speed instrument indicates no vehicle speed until said electronic switch is closed in response to a potential representative of at least a prescribed minimum engine speed.

2. An electrical system for driving instruments of a simulated vehicle for training purposes, said system including means for applying a datum electrical potential to said system, a first variable impedance having said datum signal applied to it and having its impedance varied in response to the throttle setting of said simulated vehicle, means for indicating the aparent engine speed for said simulated vehicle, means for applying a potential derived from said first variable impedance to said engine speed indicator, means for indicating engine oil pressure, a first fixed impedance, means for connecting a potential derived from said first variable impedance to a series arrangement of said first fixed impedance and said oil pressure indicator, means for indicating engine oil temperature, a second fixed impedance, means for applying a potential derived from said first variable impedance to a series arrangement of said second fixed impedance and said oil temperature indicator, a first integrating circuit connected to said oil temperature indicating instrument to render said oil temperature indicating instrument insensitive to rapid variations in the potential representative of engine speed, and a second integrating circuit connected to said oil pressure indicating instrument for rendering that instrument insensitive to rapid variations in applied potential.

3. A system for controlling the indication of air speed in a simulated vehicle trainer, said system comprising a first potentiometer having a first movable contact, means for applying a direct voltage across said first potentiometer, means for adjusting the position of said first movable contact in proportion to the setting of a simulated vehicle throttle to derive from said first potentiometer a first potential which is proportional to engine speed, a second potentiometer having second movable contact, means for applying said direct voltage across said second potentiometer, means for adjusting the position of said second movable contact in proportion to the simulated attitude of said simulated vehicle with the horizon to derive from said second potentiometer a second potential proportional to the angle between the longitudinal axis of said vehicle and the horizon, an electronic valve having a main conduction path, means for applying said first potential to one side of said main conduction path, means for applying said second potential to the other side of said main conduction path, an air speed indicator, means for applying the output from said electronic valve to one side of said air speed indicator, and means for applying to the other side of said air speed indicator signals indicative of the application of brakes so that said indicator responds to the resultant of the signals applied across it.

References Cited
UNITED STATES PATENTS

| | | | |
|---|---|---|---|
| 2,510,161 | 6/1950 | Wilkinson et al. | 35—12 |
| 2,506,949 | 5/1950 | Burelbach et al. | 35—12 |
| 2,731,737 | 1/1956 | Stern | 35—12 |
| 2,842,867 | 7/1958 | Dehmel | 35—12 |

EUGENE R. CAPOZIO, Primary Examiner

P. V. WILLIAMS, Assistant Examiner